United States Patent [19]

Nove et al.

[11] Patent Number: 5,285,563

[45] Date of Patent: Feb. 15, 1994

[54] METHOD OF MAKING A STATIC ELECTROMAGNETIC INDUCTOR

[75] Inventors: Marie-Claude Nove, Paris; Michel Kouyoumdjian, Chatou, both of France

[73] Assignee: Rotelec, Bagnolet

[21] Appl. No.: 817,624

[22] Filed: Jan. 7, 1992

[30] Foreign Application Priority Data

Jan. 11, 1991 [FR] France .................. 91 00297

[51] Int. Cl.$^5$ .................................. H02K 15/06
[52] U.S. Cl. ................................ 29/596; 29/605; 29/606; 310/42; 310/43; 310/218
[58] Field of Search ............. 29/596, 598, 605, 606; 310/42, 43, 194, 218

[56] References Cited

U.S. PATENT DOCUMENTS 2,655,613 10/1953 Wieseman .
4,990,810 2/1991 Newhouse .................. 310/194

FOREIGN PATENT DOCUMENTS 773665 5/1957 United Kingdom .
89/06874 7/1989 World Int. Prop. O. .

OTHER PUBLICATIONS

Patent Abstracts of Japan, vol. 6, No. 238 (E-144)(1116) dated Nov. 26, 1982.
Soviet Inventions Illustrated, Section R, week B08, issued Apr. 4, 1979.
Patent Abstracts of Japan, vol. 9, No. 10 (E-290)(1233) dated Jan. 17, 1985.

*Primary Examiner*—Carl E. Hall
*Attorney, Agent, or Firm*—Sughrue, Mion, Zinn, Macpeak & Seas

[57] ABSTRACT

An electromagnetic inductor for generating a rotating field for stirring the core of a metal casting while the core is still liquid, which metal casting is to be cooled by external water circulation. The excitation winding which is to be mounted on each of its pole pieces must, prior to this, be fixed around a tubular winding support so as to form an annular winding block. The block is then fitted on the pole piece and locked thereto in reversible manner. The inductor may be used in facilities for continuous casting of steel products.

7 Claims, 3 Drawing Sheets

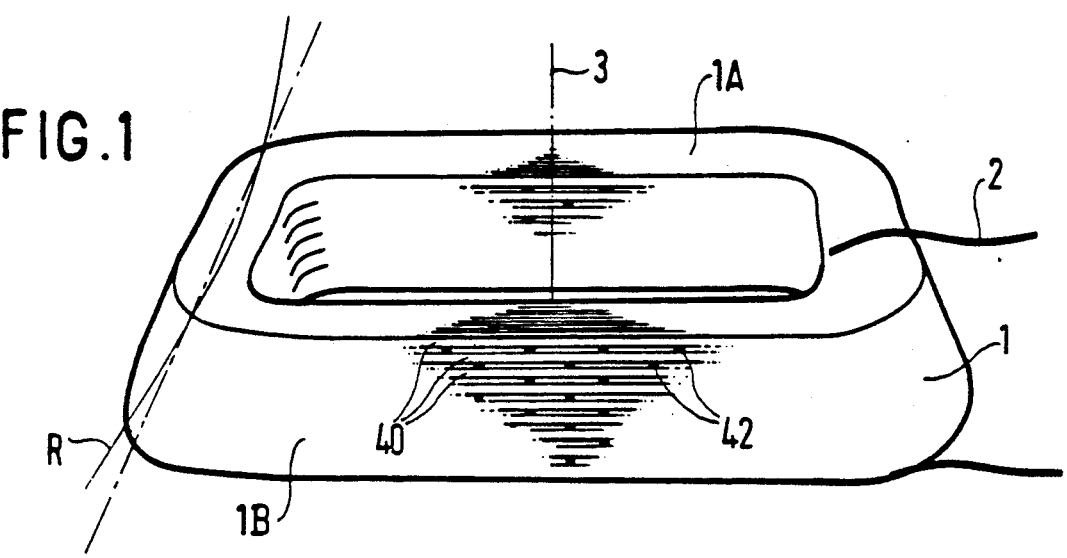
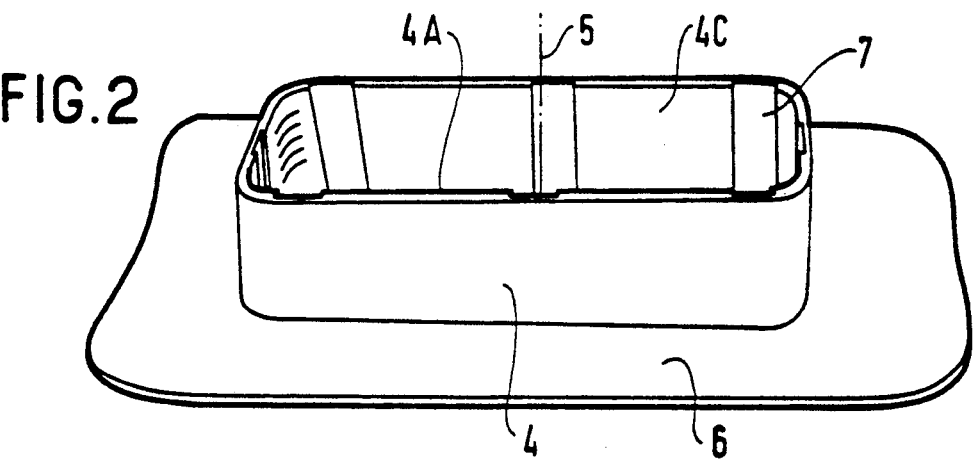
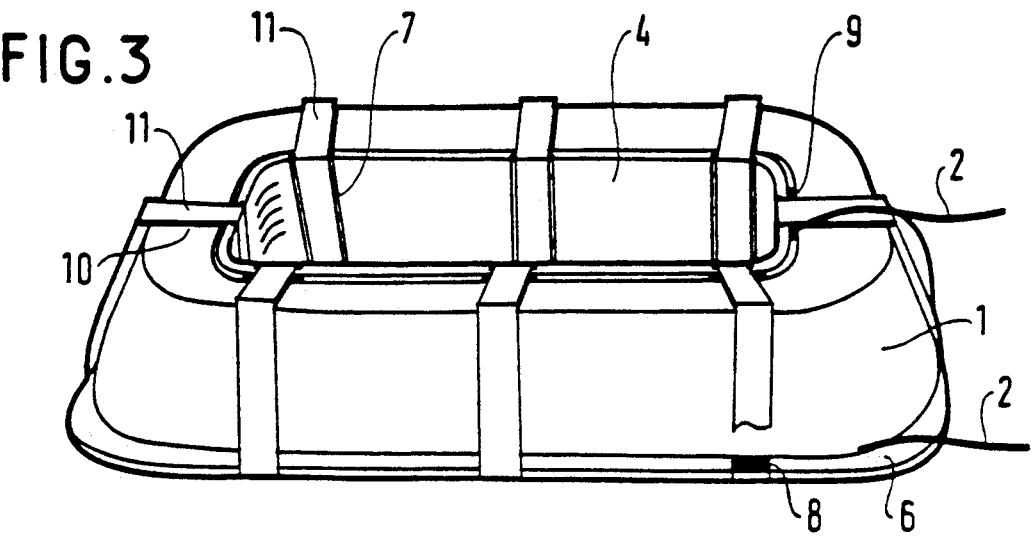

METHOD OF MAKING A STATIC ELECTROMAGNETIC INDUCTOR

The present invention relates in general to generating a magnetic field, in particular a rotating or slipping moving field. More specifically, but not exclusively, it applies to the case when the field is intended for stirring a molten metal, such as the metal constituting the still-liquid core of a cast steel product which is gradually solidifying from its outside surface inwards.

BACKGROUND OF THE INVENTION

Such a field is generated in known manner by an electromagnetic inductor which, in the case of stirring a molten metal, may be referred to as a "stirrer". The inductor includes the following components:

a magnetic circuit constituted by a yoke for looping a magnetic flux and including wide teeth which form a sequence of projecting pole pieces;

prefabricated excitation windings, each constituted by an insulated conductor wound about a winding axis, the windings being coaxially mounted around respective pole pieces of the magnetic circuit; and electric power supply means for supplying the windings with excitation electrical currents, in particular alternating currents having phases forming a sequence in time that is associated with the sequence of poles so as to generate a moving magnetic field.

The magnetic circuit of a stirrer is conventionally formed by a stack of plane magnetic laminations which are clamped together by means of tie bars. The magnetic circuit may be manufactured using two different known manufacturing methods. In the first one of these methods, the magnetic circuit is obtained by mechanically assembling:

a yoke made of a stack of plane magnetic laminations; and pole pieces each of which is made of a stack of plane magnetic laminations and is then mechanically fixed to the yoke; in this case, by construction, the pole pieces are detachable and are referred to as "attached" pieces.

In the second method of manufacturing a magnetic circuit, the circuit is made of a stack of plane laminations which have been cut out so as to have a solid portion and wide teeth; in this case, by construction, the yoke and the pole pieces are integral.

In order to make such a stirrer, the large alternating electromagnetic forces to which the conductors in the winding are subjected when in use make it necessary to use shims, bindings and an impregnation resin.

Cooling the windings by causing water to circulate is also known.

Cooling may be internal. In which case, the water flows through the inside channel of a tubular conductor making up the winding. This type of cooling requires distilled water to be used and leads to problems arising from the need to make relatively complex and bulky hydraulic connections inside the limited volume available for the inductor and from the need to use sufficiently powerful pumps.

These hydraulics problems are simplified in inductors using external cooling. In this case, the windings are disposed inside a housing in which cooling water is caused to circulate. The windings are therefore immersed in the water and they are cooled via the walls of the winding block they form together with the resin with which they are impregnated. Sealing arrangements are provided so as to prevent any water reaching the copper of the conductors.

In such a cooling system, the use of distilled water is no longer necessary, but the life-span of such immersed windings is essentially linked to the continued effectiveness of the sealing arrangements against the surrounding water—both for the conductors and for the impregnation. That is why numerous precautions are taken in selecting the insulating materials, the manufacturing and impregnation methods, and the cooling water—in particular, efforts are made to obtain water having a low solids content, especially of ferromagnetic particles, and to limit the size of these particles. In spite of all these precautions, the life-span of such windings is limited in the long-term and generally (for all windings) by the water-absorption capacities of the various materials currently available. These absorption capacities relate to microscopic pores through which water leaks develop towards the masses of metal constituted essentially by the magnetic circuit of the inductor. The power dissipated by the leaks transforms the microscopic pores into macroscopic pores which leads to complete breaks in the insulation in the medium term. Since the copper is then no longer protected, it is attacked by electrolysis and this generally leads to the winding conductor breaking.

The life-span may also be reduced drastically and locally (e.g. on one winding) by accidental phenomena (e.g. a foreign body in the volume containing the windings, a malfunction in the water circuit, etc.).

Therefore, there are two problems. The first is to increase the overall life of the inductor. The second is to facilitate replacing a faulty winding.

An object of the present invention is to solve these two problems more simply and better than before.

SUMMARY OF THE INVENTION

To this end, the invention provides a method of making an inductor, wherein the winding which is to be mounted on each of the pole pieces of the inductor must previously be fixed around a tubular winding support so as to form an annular winding block which is then fitted on pole piece and is locked thereto in reversible manner.

BRIEF DESCRIPTION OF THE DRAWINGS

An embodiment of the invention is described by way of example with reference to the accompanying drawings, in which:

FIG. 1 is a simplified view of a prefabricated winding designed to be incorporated into an inductor given as an example of how the invention may be embodied;

FIG. 2 is a view of a support for the winding;

FIG. 3 is a view of a winding block obtained by assembling the winding onto a winding support;

Where the same item is shown in more than one figure, it is designated by the same reference number.

DETAILED DESCRIPTION

Figure 4:
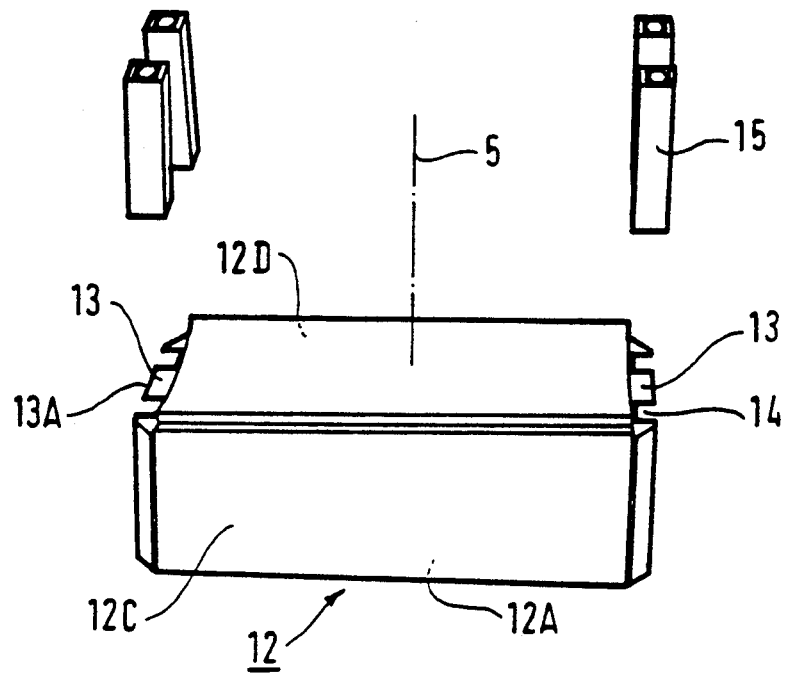
FIG. 4 is a view of a pole piece designed to be assembled with the winding block and of keys designed to be interposed between the pole piece and the block.

The following description corresponds to making a rotating-field inductor which is cylindrical in overall shape and which constitutes a stirrer for use in the steel industry. The windings of this stirrer are powered by three-phase electricity. Its magnetic circuit is constituted by a magnetic yoke and by attached pole pieces.

Implementing the present invention involves making a winding and a winding support.

FIG. 1 is a simplified view of a prefabricated winding 1. The winding comprises an axial sequence of pancake coils. Each pancake such as 40 is made up of an insulated conductor 2 wound in successive coplanar turns 10 bearing against a form (not shown) about a pancake axis (not shown). It is then curved by being bent about an axis of curvature intersecting the pancake axis at right angles outside the pancake. The pancakes are then stacked coaxially to a winding axis 3. Shims such as 42 maintain gaps (not shown) between successive pancakes to allow a liquid, and in particular cooling water, to pass therethrough. The finished winding is in the form of a curved annular block. The block is curved along an arc of a circle R which is shown merely to facilitate understanding. The axis of the circle constitutes an axis of curvature (not shown in FIG. 1) common to all of the pancakes. The axis of curvature is situated above and distant from the block in the plane of the figure. The axis of curvature is subsequently made to coincide with an inductor axis 30 shown in FIG. 6. A top face 1A of the block is defined as the face having the smaller radius of curvature, and a bottom face 1B as that having the larger radius of curvature.

FIG. 2 shows a winding support. This winding support comprises a tubular winding former 4, having an axis 5 and a bottom edge 4A which is rigidly connected to an annular flange 6 extending outwards from this edge in directions that are substantially radial relative to the former.

The tubular winding former 4 and the flange 6 are preferably made of an insulating material having suitable mechanical properties and being thick enough for the assembly to be almost perfectly rigid once it has been assembled. For a stirrer, this thickness typically lies in the range about 3 mm to about 5 mm, the material being composite, i.e. made up of glass fibers or carbon fibers impregnated with a thermosetting resin.

The outside dimensions of the tubular former 4 correspond to the dimensions of the axial hole through the annular winding 1 allowing for a certain amount of clearance distributed around the periphery of the former.

The height of the former 4 (measured in the direction of the axis 5 of the former) is also equal to the height of the winding 1 (measured in the direction of the winding axis 3), plus the thickness of the annular flange and plus assembly clearance at both the top face and the bottom face of the winding 1. The inside wall of the winding former 4 has grooves 7 running over its entire height and evenly distributed around the periphery.

The radial extent of the annular flange 6 corresponds to the radial extent of the outside face of the winding 1 plus clearance on either side.

Once the winding 1 and the winding support have been made, the next steps consist in fitting the winding 1 over the tubular winding former 4, in positioning the winding so that its axis 3 coincides with the axis 5 of the tubular winding former 4, and in fixing the winding on its winding support by means of shims and bindings, so as to obtain a solid winding assembly which is relatively compact.

This assembly is shown in FIG. 3.

The following are disposed at right angles to each groove 7 in the tubular former 4:

a shim 8, between the bottom face of the winding 1 and the top face of the annular flange 6;

a shim 9, between the inside hole in the winding 1 and the outside face of the tubular former 4; and a shim 10, on the top face of the winding 1.

A binding 11 is disposed at right angles to each set of shims 8-9-10, which binding surrounds both the winding and the winding support.

This assembly is then impregnated with a resin in such a way as to retain the central hole. The assembly then forms a winding block 32.

The impregnation step does not close off the gaps between the turns of the winding, but it stiffens the shims and bindings and gives the winding block good mechanical strength, good protection against water, and good insulation between turns and from the surrounding medium.

Figure 6:
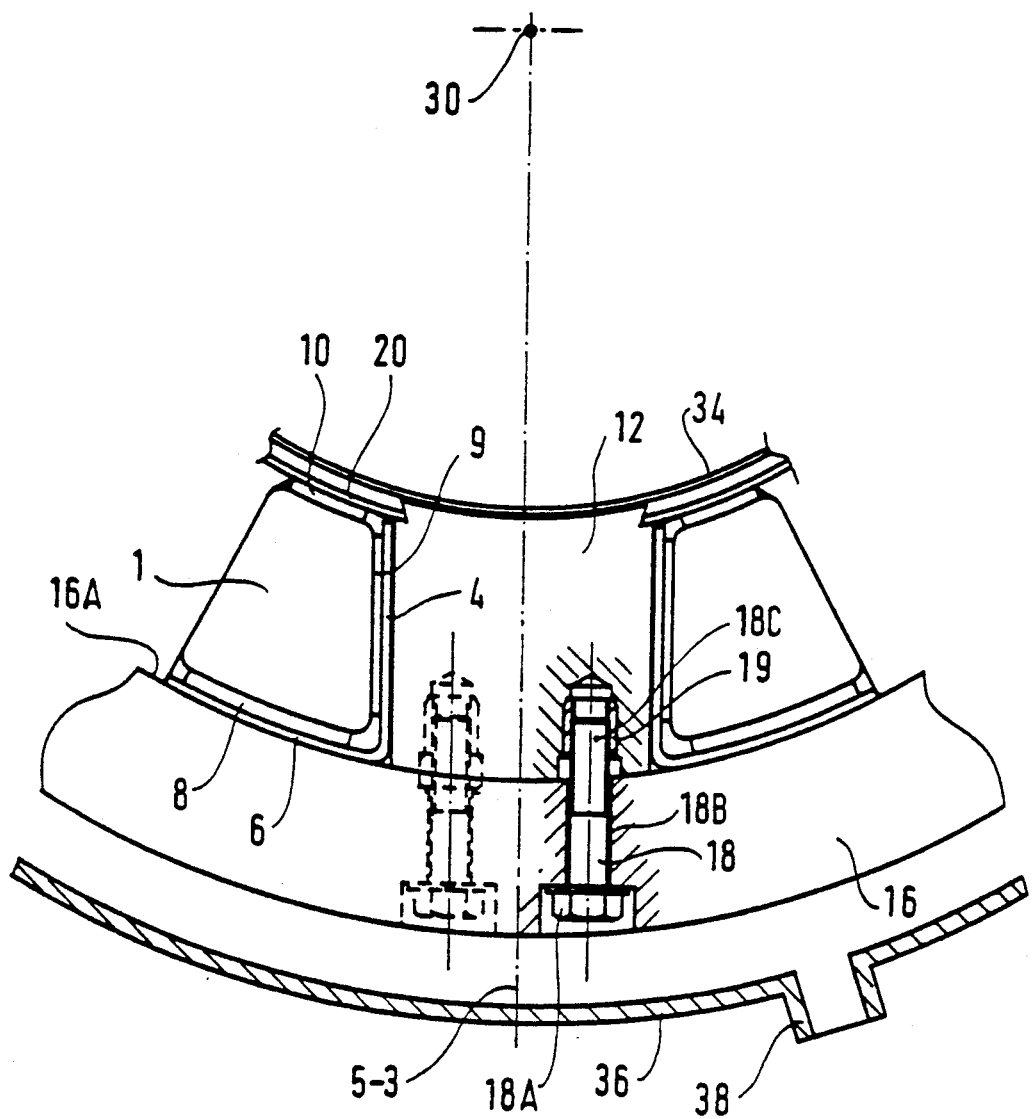
FIG. 6 is a fragmentary view in section through an inductor of the invention after the pole block has been assembled onto the yoke of a magnetic circuit.

FIG. 4 is a view of a pole piece 12. This piece is made of a stack of plane magnetic laminations which are clamped between two end plates 13 interconnected by a tie bar (not shown). The outside face such as 13A of each of the plates has two rectangular grooves 14 running over its entire height. The bottom face 12A of the pole piece is equipped with two tapped holes 19 which are not shown in this figure and which are used to mount the piece onto the inside bore of the yoke of the magnetic circuit (FIG. 6).

A peripheral surface of the pole piece comprises outside faces 13A of the plates 13 and two other faces 12C and 12D of the piece.

Figure 5:
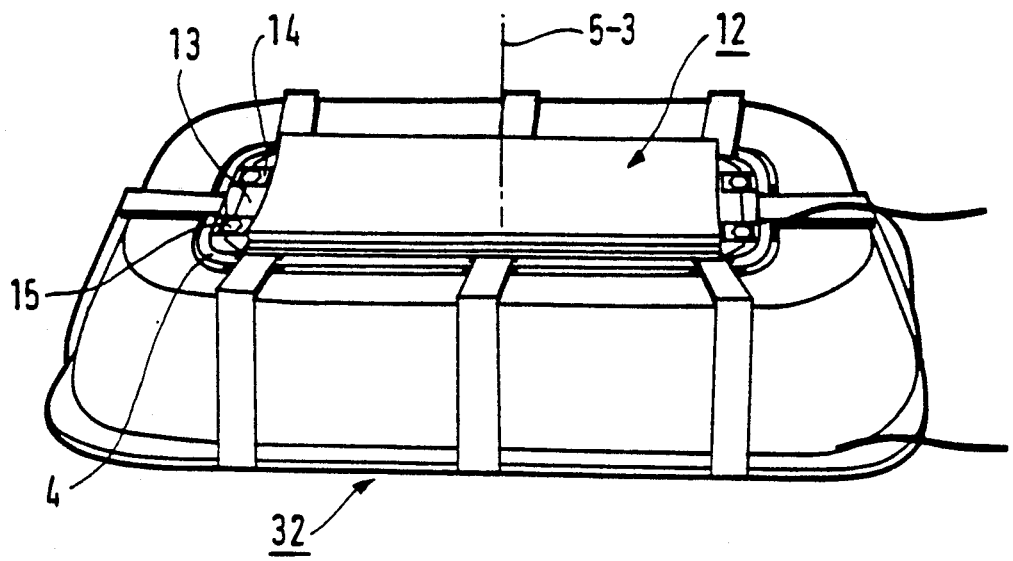
FIG. 5 is a view of a pole block obtained by mounting the winding block onto the FIG. 4 pole piece.

The next assembly step consists in fitting the winding block as shown in FIG. 3 onto the pole piece as shown in FIG. 4, and then in fixing it to the pole piece in order to obtain a pole block as shown in FIG. 5.

The winding block is fixed onto the pole piece 12 by means of winding block keys 15. These keys are interposed in removable manner between the winding former 4 and the outside surfaces of the end plates 13 of the pole piece 12. They are each equipped with a clamping device for expanding them radially, e.g. by axially driving in a wedge by means of a screw. When the screw of each key is loosened, the key is free to be slid between the winding former 4 and the side surface of one end plate 13 of the pole piece 12, inside the groove 14 in the end plate. When the screw is tightened, the radial expansion of the key mechanically locks the winding block onto the pole piece. In the example shown in FIG. 5, mechanical locking is performed by four keys 15, two on each end plate 13 of the pole piece. Such a system is reversible, loosening the key screws enabling the keys 15 to be extracted easily and thus the winding block to be removed from the pole piece 12.

The final assembly step concerns installing the pole block inside the magnetic circuit yoke 16.

The yoke is made up of a stack of magnetic laminations constituting a magnetic ring surrounding the inductor axis 30, and the yoke presents a cylindrical inside surface to the inductor axis. This surface constitutes a pole surface 16A of the yoke and receives the pole pieces. The inductor axis 30 is in general vertical. Naturally, the terms "top" and "bottom" were used above merely to facilitate the description, and do not correspond to the final position of the windings in the inductor.

FIG. 6 is a fragmentary view of the inductor after the pole block has been mounted on the yoke 16.

The assembly step initially involves giving the pole block the angular position it needs subsequently to be ready for installation on the yoke (with the axis 5 of the pole piece being perpendicular to the axis 30 of the yoke).

For the next steps, considering relatively generally various types of cylindrical inductors to which the invention may apply, two cases may be encountered:

Case No. 1:

the extent of the winding block in a circumferential direction of the inductor, i.e. substantially perpendicular to the axes 5 and 30, is small enough for all the winding blocks to be brought to their respective assembly positions by translation along the pole axes. The pole axes are defined relative to the yoke. Such an axis coincides with the axis 5 in FIG. 6.

Case No. 2:

. the extent of a pole block along the circumferential direction is too large to allow the above-described assembly method. In this case, which applies to the inductor described by way of example, the pole blocks must be made up prior to assembly. Each of them is placed in an intermediate position above the yoke, parallel to the inductor axis, and the block is finally positioned by being moved in translation parallel to the inductor axis until it reaches its final assembly position.

In FIG. 6, in both assembly cases, each pole block is assembled by means of screws 18 which go through the holes provided in the magnetic yoke 16 and are screwed into the tapped holes 19 in the pole piece 12. These screws constitute fasteners having a drive head 18A adjacent to the outside face of the yoke 16, a shaft 18B passing through the yoke and a tip 18C screwed into a pole piece 12.

The top ends of the pole pieces are dovetailed so as to enable a slot-closing key 20 to be inserted. This key may be made of an insulating material or of a non-magnetic material covered with an insulating material.

In the above-described embodiment of the present invention, the magnetic circuit is made in two parts and assembly is therefore performed in two stages:

first stage: assembling the winding block onto its pole piece; and second stage: assembling the pole block onto the magnetic yoke.

In the case of a magnetic circuit made as a single part, final assembly is performed by installing the winding block as described above directly onto a pole piece integrated into the yoke of the magnetic circuit, which piece has the same dispositions as the attached pole piece described with reference to FIG. 4. This case corresponds to the above-mentioned assembly case No. 1.

An inductor made by following the method of the invention further includes:

an inductor housing 34, 36 containing at least said pole blocks 12, 32; and a cooling circuit 38 causing water to flow through the housing in contact with the walls of said winding blocks.

It has the following two advantages:

1) Using the winding support—and to a lesser extent the slot-closing key—creates an electrical barrier between the conductors of the winding and the mass of metal constituted by the magnetic circuit. This barrier limits the magnitude of the cooling water leaks that develop between the powered conductors and the mass of metal due to natural ageing of the conductor insulating materials (occurrence of microporosity). The process of inductor deterioration is thus slowed considerably, thereby lengthening the life of the inductor. This disposition does not, however, prevent incidents due to abnormal operating conditions such as foreign bodies in the cooling circuit, or a loss of cooling water, etc.

2) In the event of an accident affecting one or more windings, the disassemblable design of the prefabricated and individually impregnated winding block enables the damaged windings to be replaced quickly and easily, without having to act on windings which are not faulty. Since a stock of such prefabricated and impregnated windings manufactured by the manufacturer of the inductor is made available to the user, it is possible for the user to repair the inductors without having to use personnel highly specialized in electrical windings, or having to use specific equipment such as impregnation facilities.

The manufacturing method of the present invention applies to all cases in which the inductor is constituted by a magnetic circuit including a certain number of pole pieces and of prefabricated windings which must each be coaxially mounted on a pole piece.

This manufacturing method is therefore valid for making a rectangular, square or circular section or flat three-phase, two-phase, slipping field, rotating field inductor.

We claim:

1. A method of making a static electromagnetic inductor including the following components:

a magnetic circuit yoke made of a ferromagnetic material;

magnetic circuit pole pieces made of a ferromagnetic material, which pieces project successively from a pole face of said yoke, each of the pieces extending along a pole axis and presenting a peripheral surface surrounding said axis;

excitation windings each made of an insulated conductor wound about a winding axis, the windings having been impregnated with a resin that has set and being respectively disposed coaxially around said pole pieces so as to constitute a sequence of pole blocks each including an association of one of said pole pieces and one of said windings; and electric power supply means to supply said windings with excitation electrical currents;

said method comprising the steps of:

making said magnetic circuit, making said pole blocks; wherein each step of making a pole block includes the following steps:

making a winding made of an insulated conductor wound about a winding axis, making a rigid insulating winding support which includes at least one tubular winding former around a central hole; and installing said winding on said winding support around said winding former on said pole piece which is associated therewith;

locking said winding on said winding support by means of shims and bindings and further locking of said winding block onto its associated pole piece by means of winding block keys interposed in a removable manner between said winding former and said peripheral surface of the pole piece; and impregnating a winding assembly made up of said winding support, said winding, said shims and said bindings such that said central hole is retained so as to form a winding block which is annular in overall shape, and wherein said step of installing the winding further comprises installing said winding block around said pole piece that is associated therewith.

2. A method according to claim 1, wherein said winding support further includes an annular flange which is connected to said tubular former via a bottom edge thereof, and which extends outwards from this edge in directions that are substantially radial relative to said winding former;
said winding being disposed on this annular flange during said installation on the winding support; and
the annular flange being interposed between the winding and said pole surface of said magnetic circuit yoke in the finished inductor.

3. A method according to claim 1, in which said removable keys are keys to which axial compression is applied to control radial expansion thereof, the radial and axial directions being relative to said pole axis.

4. A method according to claim 1, in which said step of making a winding itself comprises the following steps:
making a plurality of pancake coils, each pancake being made by winding an insulated conductor around a pancake axis in successive turns in a plane perpendicular to the pancake axis so that the pancake substantially retains its shape;
stacking said pancakes about a winding axis, said pancake axes being made to coincide with the winding axis, with axial gaps being kept between successive pancakes by means of shims so that a cooling fluid can flow through the gaps; and
fixing together the pancakes and the shims.

5. A method according to claim 1, in which said pole pieces are distinct from said magnetic circuit yoke and mounted on the yoke, said step of installing said winding block around said pole piece being performed at a distance from the yoke and forming a pole block, the method including a step of installing the pole block so as to fix the block to the yoke.

6. A method according to claim 5, wherein said step of installing said pole block on said magnetic circuit yoke comprises the following steps when the yoke constitutes a magnetic ring which is to carry said pole blocks via its inside surface:
giving said pole block the angular position it subsequently needs when in the assembly position which it is to take up in the magnetic ring so as to be mounted thereon;
intermediate positioning of said pole block in an intermediate position which is offset parallel to said pole surface of the yoke relative to said assembly position;
final positioning of said pole block by moving the block in translation until it reaches said assembly position; and
assembling said pole block on said magnetic ring.

7. A method according to claim 6, wherein said step of installing said pole block on said magnetic ring is performed by means of fasteners each of which has a drive head adjacent to an accessible surface of the yoke, a shaft passing through the ring, and a tip penetrating into said pole piece so as to fasten itself thereto.

* * * * *